US009718895B2

(12) United States Patent
Mizuno et al.

(10) Patent No.: US 9,718,895 B2
(45) Date of Patent: Aug. 1, 2017

(54) PROCESS FOR PRODUCING ACRYLIC RUBBER/FLUORINATED RUBBER COMPOSITION, CROSSLINKABLE COMPOSITION, LAMINATE AND HEAT RESISTANT AIR RUBBER HOSE

(71) Applicant: ASAHI GLASS COMPANY, LIMITED, Chiyoda-ku (JP)

(72) Inventors: Go Mizuno, Tokyo (JP); Masahide Yodogawa, Tokyo (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 272 days.

(21) Appl. No.: 14/335,385

(22) Filed: Jul. 18, 2014

(65) Prior Publication Data

US 2014/0329096 A1 Nov. 6, 2014

Related U.S. Application Data

(63) Continuation of application No. PCT/JP2013/050849, filed on Jan. 17, 2013.

(30) Foreign Application Priority Data

Jan. 18, 2012 (JP) ................................ 2012-007865

(51) Int. Cl.
*C08C 19/00* (2006.01)
*C08J 3/20* (2006.01)
(Continued)

(52) U.S. Cl.
CPC ................ *C08C 19/00* (2013.01); *B32B 1/08* (2013.01); *B32B 25/02* (2013.01); *B32B 25/042* (2013.01);
(Continued)

(58) Field of Classification Search
CPC ............. C08L 2205/22; C08L 2312/00; C08L 27/00–27/24; C08L 13/00; C08L 33/00–33/26; C08C 19/00; C08J 2327/18
See application file for complete search history.

(56) References Cited

U.S. PATENT DOCUMENTS 4,603,175 A * 7/1986 Kawachi ................ C08L 27/12
522/113
2007/0004862 A1 1/2007 Park et al.
(Continued)

FOREIGN PATENT DOCUMENTS

EP 0 598 132 A1 5/1994
EP 0 796 897 A1 9/1997
(Continued)

OTHER PUBLICATIONS

International Search Report issued Apr. 2, 2013 in PCT/JP2013/050849 filed Jan. 17, 2013.

*Primary Examiner* — Kregg Brooks
(74) *Attorney, Agent, or Firm* — Oblon, McClelland, Maier & Neustadt, L.L.P.

(57) ABSTRACT

To provide a process for producing an acrylic rubber/fluorinated rubber composition, capable of forming a layer excellent in the interlayer-adhesion with a layer formed by crosslinking a fluorinated rubber.
A process for producing an acrylic rubber/fluorinated rubber composition having particles of a crosslinked acrylic rubber (B) dispersed in a continuous phase of a fluorinated rubber (A), which comprises kneading a fluorinated rubber (A), a crosslinking agent for an acrylic rubber and a crosslinking coagent for an acrylic rubber to obtain a fluorinated rubber composition containing the crosslinking agent for an acrylic rubber and the crosslinking coagent for an acrylic rubber, and kneading under heating the obtained fluorinated rubber composition and an acrylic rubber (B) in a mass ratio of
(Continued)

Surface: fluorinated rubber (A)

fluorinated rubber (A)/acrylic rubber (B)=5/95 to 50/50 to crosslink the acrylic rubber (B), and dispersing particles of the crosslinked acrylic rubber (B) in a continuous phase of the fluorinated rubber (A).

13 Claims, 2 Drawing Sheets (51) Int. Cl.

| | |
|---|---|
| C08J 3/24 | (2006.01) |
| C08L 13/00 | (2006.01) |
| C08L 27/12 | (2006.01) |
| C08L 33/08 | (2006.01) |
| C08K 5/16 | (2006.01) |
| B32B 1/08 | (2006.01) |
| B32B 27/08 | (2006.01) |
| B32B 27/30 | (2006.01) |
| B32B 27/32 | (2006.01) |
| F16L 11/12 | (2006.01) |
| B32B 25/02 | (2006.01) |
| C08L 27/18 | (2006.01) |
| B32B 25/04 | (2006.01) |
| B32B 25/14 | (2006.01) |
| F16L 11/04 | (2006.01) |
| F16L 11/08 | (2006.01) |

(52) U.S. Cl.
CPC ............ *B32B 27/08* (2013.01); *B32B 27/308* (2013.01); *B32B 27/322* (2013.01); *C08J 3/203* (2013.01); *C08L 13/00* (2013.01); *C08L 27/18* (2013.01); *F16L 11/12* (2013.01); *B32B 2250/02* (2013.01); *B32B 2250/24* (2013.01); *B32B 2250/248* (2013.01); *B32B 2270/00* (2013.01); *B32B 2307/306* (2013.01); *B32B 2307/54* (2013.01); *B32B 2307/714* (2013.01); *B32B 2597/00* (2013.01); *B32B 2605/00* (2013.01); *C08J 2327/18* (2013.01); *C08J 2351/04* (2013.01); *C08L 2205/22* (2013.01); *C08L 2312/00* (2013.01); *F16L 11/04* (2013.01); *Y10T 428/3154* (2015.04)

(56) References Cited

U.S. PATENT DOCUMENTS

| | | | | |
|---|---|---|---|---|
| 2007/0225430 | A1* | 9/2007 | Masuda | ............... H01B 3/445 524/546 |
| 2008/0221270 | A1* | 9/2008 | Kano | ................. C08F 255/00 525/63 |
| 2011/0290525 | A1* | 12/2011 | Kimura | ................. C08K 5/20 174/110 SR |

FOREIGN PATENT DOCUMENTS

| | | |
|---|---|---|
| EP | 1 086 990 A1 | 3/2001 |
| JP | 1-299859 | 12/1989 |
| JP | 6-41379 | 2/1994 |
| JP | 6-298899 | 10/1994 |
| JP | 2004-17485 | 1/2004 |
| JP | 2007-56068 | 3/2007 |
| JP | 2007-126631 | 5/2007 |
| JP | 4168189 | 8/2008 |
| WO | 2005/111140 | 11/2005 |
| WO | 2012/026549 | 3/2012 |

* cited by examiner

Fig. 1

Surface: fluorinated rubber (A)

Fig. 2

Fluorinated rubber (A)

Acrylic rubber (B)

Acrylic rubber (B)

Fig. 3

Surface: acrylic rubber (B)

PROCESS FOR PRODUCING ACRYLIC RUBBER/FLUORINATED RUBBER COMPOSITION, CROSSLINKABLE COMPOSITION, LAMINATE AND HEAT RESISTANT AIR RUBBER HOSE

TECHNICAL FIELD

The present invention relates to a process for producing an acrylic rubber/fluorinated rubber composition, a crosslinkable composition comprising the acrylic rubber/fluorinated rubber composition and a crosslinking agent for a fluorinated rubber, a laminate having a layer formed by curing the crosslinkable composition, and a heat resistant air rubber hose.

BACKGROUND ART

A rubber hose is used as a component for automobiles or another industrial component. For example, a heat resistant air rubber hose is used for a turbo charger of a diesel automobile, etc. A heat resistant air rubber hose installed in a turbo charger has a role to supply to an engine, high temperature/high pressure compressed gas which is compressed in the turbo charger. In such compressed gas, a high temperature mist of a fuel, an engine oil, etc. discharged from the engine is also contained. Therefore, the heat resistant air rubber hose is required to have a high heat resistance, a chemical resistance, an oil resistance and a pressure resistance.

Heretofore, an acrylic rubber has been used for a heat resistant air rubber hose. In recent years, a demand for the heat resistance of the heat resistant air rubber hose has become severe, and an acrylic rubber is insufficient to satisfy such a required property. As a material which satisfies such a required property, a fluorinated rubber is available. The fluorinated rubber is excellent in properties such as the heat resistance, the chemical resistance, the oil resistance and the pressure resistance, and thereby the fluorinated rubber is suitable as a material for the heat resistant air rubber hose. However, since the fluorinated rubber is expensive, there is a problem such that the cost for the heat resistant air rubber hose becomes high.

Accordingly, it has been tried to reduce the cost for a rubber hose by forming a laminate of a fluorinated rubber and an inexpensive material such as an acrylic rubber.

Patent Document 1 discloses a laminated rubber hose comprising an inner layer made of a vinylidene fluoride-hexafluoropropylene elastic copolymer, a vinylidene fluoride-hexafluoropropylene-tetrafluoroethylene elastic copolymer, a tetrafluoroethylene-propylene elastic copolymer or a tetrafluoroethylene-vinylidene fluoride-propylene elastic copolymer, and an outer layer made of an acrylic rubber, which are co-vulcanized.

However, in general, a fluorinated rubber is poor in affinity with another rubber material such as an acrylic rubber, and in the laminated rubber hose of Patent Document 1, the adhesive property of the fluorinated rubber layer and the acrylic rubber layer is insufficient. Particularly, under high temperature conditions, they tend to peel at their bonding interface.

Here, as one of fluorinated rubber compositions, there is an acrylic rubber/fluorinated rubber composition having particles of a crosslinked acrylic rubber dispersed in a continuous phase of a fluorinated rubber. The acrylic rubber/fluorinated rubber composition is molded and crosslinked so as to be used as a molded product such as a part for automobiles or an industrial part.

Patent Document 2 discloses a process for producing an acrylic rubber/fluorinated rubber composition having particles of a crosslinked acrylic rubber dispersed in a continuous phase of a fluorinated rubber, which comprises blending a fluorinated rubber, an acrylic rubber, a third elastomer co-crosslinkable with both the fluorinated rubber and the acrylic rubber, and a crosslinking agent for an acrylic rubber, and dynamic-crosslinking them, while applying shearing deformation.

Further, Patent Document 3 discloses a production process which comprises mixing in a latex state, a latex of an inter-crosslinked epoxy group-containing acrylic rubber having a gel content of at least 80 wt % and a latex of a fluorinated rubber, followed by co-coagulating the obtained mixed latex.

However, in the process of Patent Document 2, it is necessary to carry out the dynamic-crosslinking usually at a high temperature of at least 200° C., and thereby the productivity is poor. Further, in such a process, it is necessary to add a third elastomer, and if the dynamic-crosslinking is carried out without adding the third elastomer, an exfoliation results at the interface between the fluorinated rubber phase and the acrylic rubber particles, and thereby the mechanical property is insufficient.

Further, in the process of Patent Document 3, latexes made of different materials are mixed with each other. However, in a case where latexes made of different materials are to be mixed on a commercial scale, contamination to conventional products is concerned, and therefore, it is necessary to spend high cost for facilities, for example for building a new coagulation tank, whereby the cost tends to increase, and such a process is not industrially appropriate.

Further, in Patent Documents 2 and 3, no study is made with respect to an interlayer-adhesion at the time of laminating a fluorinated rubber.

PRIOR ART DOCUMENTS

Patent Documents

Patent Document 1: JP-A-2004-17485
Patent Document 2: JP-A-01-299859
Patent Document 3: Japanese Patent No. 4168189

DISCLOSURE OF INVENTION

Technical Problem

It is an object of the present invention to provide a process for producing an acrylic rubber/fluorinated rubber composition capable of forming a layer excellent in interlayer-adhesion with a layer formed by crosslinking a fluorinated rubber, a crosslinkable composition capable of forming a layer excellent in interlayer-adhesion with a layer formed by crosslinked fluorinated rubber, an inexpensive laminate which is excellent in interlayer-adhesion with a layer made of a crosslinked fluorinated rubber, heat resistance, acid resistance, and alkali resistance, and a heat resistant air rubber hose.

Solution to Problem

The present invention provides a process for producing an acrylic rubber/fluorinated rubber composition, a crosslinkable composition, a laminate and a heat resistant air rubber hose, which have the following constructions.

[1] A process for producing an acrylic rubber/fluorinated rubber composition having particles of a crosslinked acrylic rubber (B) dispersed in a continuous phase of a fluorinated rubber (A), which comprises a step (1) of kneading a fluorinated rubber (A), a crosslinking agent for an acrylic rubber, which will not react with the fluorinated rubber (A) and a crosslinking coagent for an acrylic rubber, which will not react with the fluorinated rubber (A), to obtain a fluorinated rubber composition containing the crosslinking agent for an acrylic rubber and the crosslinking coagent for an acrylic rubber, and a step (2) of kneading under heating the fluorinated rubber composition obtained in the step (1) and an acrylic rubber (B) in a mass ratio of fluorinated rubber (A)/acrylic rubber (B)=5/95 to 50/50 to crosslink the acrylic rubber (B), and dispersing particles of the crosslinked acrylic rubber (B) in a continuous phase of the fluorinated rubber (A).

[2] The process for producing an acrylic rubber/fluorinated rubber composition according to the above [1], wherein the fluorinated rubber (A) is a copolymer having repeating units based on tetrafluoroethylene and repeating units based on propylene.

[3] The process for producing an acrylic rubber/fluorinated rubber composition according to the above [2], wherein the molar ratio of the repeating units based on tetrafluoroethylene to the repeating units based on propylene ((repeating units based on TFE)/(repeating units based on P)) in the fluorinated rubber (A) is from 40/60 to 70/30.

[4] The process for producing an acrylic rubber/fluorinated rubber composition according to any one of the above [1] to [3], wherein the fluorine content in the fluorinated rubber (A) is from 40 to 75 mass %.

[5] The process for producing an acrylic rubber/fluorinated rubber composition according to any one of the above [1] to [4], wherein the acrylic rubber (B) comprises from 30 to 100 mass % of repeating units based on a (meth)acrylic monomer, from 0 to 30 mass % of repeating units based on ethylene, from 0 to 40 mass % of repeating units based on vinyl acetate and from 0.1 to 20 mass % of repeating units based on a crosslinkable group-containing monomer.

[6] The process for producing an acrylic rubber/fluorinated rubber composition according to the above [5], wherein the crosslinkable group in the crosslinkable group-containing monomer is an epoxy group.

[7] The process for producing an acrylic rubber/fluorinated rubber composition according to any one of the above [1] to [6], wherein in the step (1), from 0.5 to 20 parts by mass of the crosslinking agent for an acrylic rubber and from 0.05 to 10 parts by mass of the crosslinking coagent for an acrylic rubber per 100 parts by mass the fluorinated rubber (A) are kneaded to obtain the fluorinated rubber composition.

[8] The process for producing an acrylic rubber/fluorinated rubber composition according to any one of the above [1] to [7], wherein in the step (2), the fluorinated rubber composition and the acrylic rubber (B) are kneaded under heating to crosslink the acrylic rubber (B), and the crosslinked acrylic rubber (B) particles having an average particle size of from 2 to 30 μm are dispersed in a continuous phase of the fluorinated rubber (A).

[9] A crosslinkable composition, which comprises the acrylic rubber/fluorinated rubber composition produced by the process as defined in any one of the above [1] to [8] and a crosslinking agent for a fluorinated rubber.

[10] The crosslinkable composition according to the above [9], wherein the crosslinking agent for a fluorinated rubber is an organic peroxide.

[11] The crosslinkable composition according to the above [9] or [10], wherein the content of the crosslinking agent for a fluorinated rubber is from 0.1 to 10 parts by mass per 100 parts by mass of the fluorinated rubber (A).

[12] The crosslinkable composition according to any one of the above [9] to [11], which further contains as a crosslinking coagent for a fluorinated rubber, triallyl cyanurate, triallyl isocyanurate, triacryl formal, triallyl trimellitate, dipropargyl terephthalate, diallyl phthalate, tetraallyl phthalamide or triallyl phosphate.

[13] The crosslinkable composition according to any one of the above [9] to [12], which further contains as a filler, carbon black.

[14] A laminate which comprises a layer formed by crosslinking the crosslinkable composition as defined in any one of the above [9] to [13] and a layer formed by crosslinking a fluorinated rubber (C).

[15] The laminate according to the above [14], wherein the fluorinated rubber (C) is a copolymer comprising repeating units based on tetrafluoroethylene and repeating units based on propylene.

[16] A heat resistant air rubber hose, which comprises a tubular outer layer formed by crosslinking the crosslinkable composition as defined in any one of the above [9] to [13] and an inner tubular layer formed by crosslinking a fluorinated rubber (C) on an inner periphery of the outer layer.

[17] The heat resistant air rubber hose according to the above [16], wherein the fluorinated rubber (C) is a copolymer comprising repeating units based on tetrafluoroethylene and repeating units based on propylene.

Advantageous Effects of Invention

According to the process for producing an acrylic rubber/fluorinated rubber composition of the present invention, a fluorinated rubber (A), a crosslinking agent for an acrylic rubber and a crosslinking coagent for an acrylic rubber are kneaded, whereby a fluorinated rubber composition containing the crosslinking agent for an acrylic rubber and the crosslinking coagent for an acrylic rubber which have excellent dispersibility, can be obtained.

Further, the fluorinated rubber composition and an acrylic rubber (B) are kneaded under heating to crosslink the acrylic rubber (B), whereby the acrylic rubber (B) is formed into the particles, while shearing force is applied to the acrylic rubber (B), and thus, an acrylic rubber/fluorinated rubber composition having the particles of the crosslinked acrylic rubber (B) dispersed in a continuous phase of the fluorinated rubber (A), can be obtained.

Further, in the fluorinated rubber composition, the crosslinking agent for an acrylic rubber and the crosslinking coagent for an acrylic rubber are almost uniformly dispersed, whereby the acrylic rubber (B) is excellent in the crosslinking property, and the heating temperature at the time of the crosslinking can be maintained low. Therefore, the heat deterioration of the rubber can be suppressed, and the acrylic rubber/fluorinated rubber composition can be produced with good productivity.

Further, according to the crosslinkable composition of the present invention, although the content of a fluorinated rubber (A) is low, a layer which is excellent in interlayer-adhesion with a layer formed by crosslinking a fluorinated rubber can be formed.

Further, the laminate of the present invention has a layer formed by crosslinking the crosslinkable composition of the present invention and a layer formed by crosslinking a fluorinated rubber (C), whereby the interlayer-adhesion between them is excellent even under a high temperature condition.

Further, the heat resistant air rubber hose of the present invention comprises a tubular outer layer formed by crosslinking the crosslinkable composition and a tubular inner layer formed by crosslinking a fluorinated rubber (C) on an inner periphery of the outer layer, whereby the interlayer-adhesion between them is excellent even under a high temperature condition. Further, if the heat resistant air rubber hose is used in an application to an air hose for automobiles, which is required to have a high temperature/high pressure resistance, an oil or the like will not leak to a surface of the heat resistant air rubber hose, and the excellent durability can be obtained.

DESCRIPTION OF EMBODIMENTS

The fluorinated rubber (A) to be used in the process for producing the acrylic rubber/fluorinated rubber composition of the present invention is not particularly restricted, and conventional one may be used.

For example, a tetrafluoroethylene/propylene copolymer, a tetrafluoroethylene/propylene/vinylidene fluoride copolymer, a tetrafluoroethylene/propylene/vinyl fluoride copolymer, a tetrafluoroethylene/propylene/perfluoro(propylvinyl ether) copolymer, a tetrafluoroethylene/propylene/perfluoro(methylvinyl ether) copolymer, a tetrafluoroethylene/propylene/perfluoro(ethylvinyl ether) copolymer, a tetrafluoroethylene/propylene/trifluoroethylene copolymer, a tetrafluoroethylene/propylene/pentafluoropropylene copolymer, a tetrafluoroethylene/propylene/chlorotrifluoroethylene copolymer, a tetrafluoroethylene/propylene/ethylidene norbornene copolymer, a vinylidene fluoride/hexafluoropropylene copolymer, a vinylidene fluoride/hexafluoropropylene/tetrafluoroethylene copolymer, a vinylidene fluoride/hexafluoropropylene/perfluoro(ethylvinyl ether) copolymer or a vinylidene fluoride/hexafluoropropylene/perfluoro(methylvinyl ether) copolymer may be mentioned.

Such copolymers may be used alone, or two or more of them may be used in combination. Among them, a copolymer comprising repeating units based on tetrafluoroethylene (hereinafter, referred to as "repeating units based on TFE") and repeating units based on propylene (hereinafter, referred to as "repeating units based on P") is preferred, since it is excellent in acid resistance and alkali resistance. In the copolymer comprising repeating units based on TFE and repeating units based on P, the molar ratio of the repeating units based on TFE to the repeating units based on P ((repeating units based on TFE)/(repeating units based on P)) is preferably from 40/60 to 70/30, more preferably from 45/55 to 65/35, most preferably from 50/50 to 60/40.

Further, repeating units based on a monomer other than tetrafluoroethylene and propylene (hereinafter referred to as "repeating units based on another monomer") may be contained, and in a case where such repeating units based on another monomer are contained, the content is preferably at most 10 mol %, more preferably at most 5 mol % in the copolymer. The content is particularly preferably from 0.1 to 5 mol %.

As a particularly preferred specific example of the fluorinated rubber (A), a tetrafluoroethylene/propylene copolymer may be mentioned, since it is excellent in acid resistance and alkali resistance. As an example of a commercially available product of the tetrafluoroethylene/propylene copolymer, "AFLAS150P" (manufactured by Asahi Glass Company, Limited), etc. may be mentioned.

The fluorine content in the fluorinated rubber (A) is preferably from 40 to 75 mass %, more preferably from 45 to 75 mass %, most preferably from 50 to 75 mass %. When the fluorine content falls within the above range, the heat resistance, the chemical resistance, the electrical insulating property and the steam resistance are excellent.

The acrylic rubber (B) used in the process for producing an acrylic rubber/fluorinated rubber composition of the present invention is not particularly restricted, and conventional one may be used.

The acrylic rubber may, for example, be an acrylic rubber comprising as the main component, one, two or more of an acrylic monomer or a methacrylic monomer (hereinafter, an acrylic monomer and a methacrylic monomer are referred to as "(meth)acrylic monomer" together).

The acrylic monomer may, for example, be an acrylate such as methyl acrylate, ethyl acrylate, propyl acrylate, n-butyl acrylate, n-octyl acrylate, methoxymethyl acrylate, methoxyethyl acrylate or ethoxyethyl acrylate.

Further, as the methacrylic monomer, methacrylates corresponding to the above acrylic monomers may be mentioned.

As the specific example of the acrylic rubber (B), preferred is one wherein in an acrylic rubber, the content of repeating units based on a (meth)acrylic monomer is from 30 to 100 mass %, the content of repeating units based on ethylene is from 0 to 30 mass %, and the content of repeating units based on vinyl acetate is from 0 to 40 mass %. The content of repeating units based on a (meth)acrylic monomer in an acrylic rubber is more preferably from 40 to 100 mass %, further preferably from 50 to 100 mass %, particularly preferably from 70 to 100 mass %. In a case where repeating units based on ethylene are contained, the content is more preferably from 0.1 to 20 mass %, most preferably from 1 to 10 mass %. In a case where repeating units based on vinyl acetate are contained, the content is preferably from 0.1 to 30 mass %, most preferably from 1 to 20 mass %. Within the above ranges, the heat resistance is excellent.

The acrylic rubber (B) preferably contains repeating units based on a crosslinkable group-containing monomer. The content is preferably from 0.1 to 20 mass %, more preferably from 1 to 10 mass %, most preferably from 2 to 5 mass %. Within the above range, the acrylic rubber (B) is excellent in the crosslinking property.

As the crosslinkable group-containing monomer, a monomer having an active halogen group, an epoxy group, a carboxy group, a hydroxy group, an amido group, a diene group or the like may be mentioned. Among them, the crosslinkable group is preferably an epoxy group or a carboxy group, more preferably an epoxy group. The crosslinkable group-containing monomer having an epoxy group is preferably glycidyl methacrylate or the like. The crosslinkable group-containing monomer having a carboxy group is preferably monobutyl maleate or the like.

Since in the present invention, as a crosslinking agent for an acrylic rubber, one which peroxide-crosslinks and which will not react to a fluorinated rubber is used, the acrylic rubber (B) is preferably an acrylic rubber which amine-crosslinks, more preferably an acrylic rubber having an epoxy group.

As an example of a commercially available product of the acrylic rubber having an epoxy group, "DENKA ER-5300" (manufactured by Denki Kagaku Kogyo Kabushiki Kaisha) may be mentioned.

A crosslinking agent for an acrylic rubber, which is used in the process for producing an acrylic rubber/fluorinated rubber composition of the present invention is one having no reactivity to the fluorinated rubber (A). In a case where the acrylic rubber (B) has an epoxy group, the crosslinking agent for an acrylic rubber is preferably an amine, an acid or a compound having an isocyanate group. Among them, a compound having an amino group such as a guanidine, an imidazole or an analog thereof is preferred.

As the guanidine, diphenylguanidine, triphenylguanidine, di-o-tolylguanidine, o-tolylbiguanide, a dicatechol borate of di-o-tolylguanidine, diphenylguanidinephthalate or a mixed diarylguanidine may be mentioned. As the imidazole, not only imidazole, but also a substituted imidazole in which a hydrogen atom bonded to a carbon atom and/or a nitrogen atom in an imidazole ring is substituted by a hydrocarbon group may be mentioned. Specifically, preferred is imidazole, 2-methylimidazole, 2-ethyl-4-methylimidazole, 2-phenylimidazole, 2-undecylimidazole, 2-heptadecylimidazole, 2-phenyl-4-methylimidazole, 1-benzyl-2-methylimidazole, 1-cyanoethyl-2-methylimidazole or 1-cyanoethyl-2-phenylimidazole.

One type of the guanidine or the imidazole may be used alone, or two or more types thereof may be used in combination. Further, the guanidine and the imidazole may be used in combination.

The crosslinking coagent for an acrylic rubber, which is used in the process for producing an acrylic rubber/fluorinated rubber composition of the present invention has no reactivity to the fluorinated rubber (A). Such a crosslinking coagent may, for example, be a polyamine type crosslinking coagent, an ammonium salt of an organic acid or the like.

The polyamine type crosslinking coagent is not particularly restricted, so long as it is a compound having at least 2 amino groups or it becomes a compound having at least 2 amino groups at the time of crosslinking. Preferred is a compound wherein plural hydrogen atoms in an aliphatic hydrocarbon or an aromatic hydrocarbon are substituted by amino groups or hydrazide structures (structures represented by $-CONHNH_2$, wherein CO represents a carbonyl group). As specific examples, (1) an aliphatic polyamine such as hexamethylenediamine, hexamethylenediamine carbamate, tetramethylenepentamine, hexamethylenediaminecinnamaldehyde adduct or hexamethylenediaminedibenzoate; (2) an aromatic polyamine such as 2,2-bis{4-(4-aminophenoxy)phenyl}propane, 4,4'-methylenedianiline, m-phenylenediamine, p-phenylenediamine or 4,4'-methylenebis(o-chloroaniline); (3) a compound having at least 2 hydrazide structures such as dihydrazide isophthalate, dihydrazide adipate or dihydrazide sebacate; or (4) ammonium isocyanurate, may be mentioned.

As the organic ammonium salt, ammonium benzoate, ammonium adipinate, zinc dimethyldithiocarbamate or the like is mentioned, and ammonium benzoate is preferred since the crosslinking property and the availability are excellent.

The process for producing an acrylic rubber/fluorinated rubber composition of the present invention comprises the following steps (1) and (2).

Step (1): A step of kneading a fluorinated rubber (A), a crosslinking agent for an acrylic rubber and a crosslinking coagent for an acrylic rubber to obtain a fluorinated rubber composition containing the crosslinking agent for an acrylic rubber and the crosslinking coagent for an acrylic rubber.

Step (2): A step of kneading under heating the fluorinated rubber composition obtained in the step (1) and an acrylic rubber (B) to crosslink the acrylic rubber (B), and dispersing the crosslinked acrylic rubber (B) in a continuous phase of the fluorinated rubber (A).

Now, each step will be explained in detail.

In the step (1), a fluorinated rubber (A), a crosslinking agent for an acrylic rubber and a crosslinking coagent for an acrylic rubber are kneaded. The crosslinking agent for an acrylic rubber and the crosslinking coagent for an acrylic rubber are added and kneaded with the fluorinated rubber (A) having a good roll processing property, whereby it is possible to obtain a fluorinated rubber composition in which the crosslinking agent for an acrylic rubber and the crosslinking coagent for an acrylic rubber are almost uniformly dispersed.

In the step (1), the mixing ratio of the fluorinated rubber (A), the crosslinking agent for an acrylic rubber and the crosslinking coagent for an acrylic rubber is preferably from 0.5 to 20 parts by mass of the crosslinking agent for an acrylic rubber and from 0.05 to 10 parts by mass of the crosslinking coagent for an acrylic rubber, more preferably from 1.5 to 15 parts by mass of the crosslinking agent for an acrylic rubber and from 0.5 to 5 parts by mass of the crosslinking coagent for an acrylic rubber, per 100 parts by mass of the fluorinated rubber (A). If the amount of the crosslinking agent for an acrylic rubber to be used or the amount of the crosslinking coagent for an acrylic rubber to be used is too small, the crosslinking density of an acrylic rubber tends to be low, and the mechanical property, the oil resistance, the heat resistance, etc. of the crosslinked acrylic rubber/fluorinated rubber composition are insufficient in some cases. On the other hand, if the amount of the crosslinking agent for an acrylic rubber to be used or the amount of crosslinking coagent for an acrylic rubber to be used is too large, the crosslinking density of an acrylic rubber tends to be too high, and the elongation of the crosslinked acrylic rubber/fluorinated rubber composition tends to be low.

The ratio of the crosslinking agent for an acrylic rubber and the crosslinking coagent for an acrylic rubber is preferably from 10 to 50 parts by mass of the crosslinking coagent for an acrylic rubber, more preferably from 20 to 40 parts by mass, per 100 parts by mass of the crosslinking agent for an acrylic rubber. When the ratio of the crosslinking agent for an acrylic rubber and the crosslinking coagent for an acrylic rubber falls within the above range, the crosslinking property is high, and a crosslinking reaction can be completed within a predetermined time.

In the step (1), the method for kneading a fluorinated rubber (A), a crosslinking agent for an acrylic rubber and a crosslinking coagent for an acrylic rubber is not particularly restricted, and a conventional method may be used. The kneading temperature is preferably from 30 to 100° C., more preferably from 50 to 80° C. The kneading time is preferably from 5 to 60 minutes, more preferably from 10 to 30 minutes. As a kneading device, for example, a kneader, a banbury mixer, a monoaxial extruder, a biaxial extruder or the like may be used.

In the step (2), while kneading under heating the fluorinated rubber composition obtained in the step (1) and an acrylic rubber (B), the acrylic rubber (B) is crosslinked. By kneading under heating the fluorinated rubber composition and the acrylic rubber (B) to crosslink (dynamically crosslink) the acrylic rubber (B), shearing force is applied to the acrylic rubber (B), whereby the acrylic rubber (B) is dispersed as particles, and an acrylic rubber/fluorinated rubber composition having particles of the crosslinked acrylic rubber (B) dispersed in a continuous phase of the fluorinated rubber (A), can be obtained.

Further, the particle size of the crosslinked acrylic rubber (B) is maintained to be small. The reason is considered that molecules are more entangled at interfaces of the acrylic rubber (B) and the fluorinated rubber (A). In such a case, if applying shearing force is stopped, the particles of the acrylic rubber (B) agglomerate one another, the particle size becomes large, and entanglements of molecules are reduced. Thus, by crosslinking the acrylic rubber (B) while kneading, an excellent dispersion state can be maintained as it is.

Further, since the crosslinking agent for an acrylic rubber and the crosslinking coagent for an acrylic rubber are almost uniformly dispersed in the fluorinated rubber composition, the acrylic rubber (B) is excellent in the crosslinking property, and the heating temperature at the time of dynamically crosslinking can be maintained low.

Further, when dynamically crosslinking the acrylic rubber (B), only the acrylic rubber (B) is crosslinked, and the fluorinated rubber (A) is not substantially crosslinked, however, a part of the fluorinated rubber (A) may be physically entangled with the acrylic rubber (B) so as to pseudo crosslink. Whether the fluorinated rubber (A) pseudo-crosslinks with the acrylic rubber (B) or not can be evaluated by measuring a gel component ratio of the acrylic rubber/fluorinated rubber composition. That is, since in the dynamic crosslinking, the fluorinated rubber (A) itself is not substantially crosslinked, if it is detected that the amount of a gel component of an acrylic rubber/fluorinated rubber composition after dynamic crosslinking is larger than a charged amount of the acrylic rubber (B), it means that a part of the fluorinated rubber (A) is physically entangled with the acrylic rubber (B) so as to pseudo-crosslinks.

In the step (2), the mixed ratio of the fluorinated rubber composition and the acrylic rubber (B) is in a mass ratio, fluorinated rubber (A)/acrylic rubber (B)=5/95 to 50/50, preferably 10/90 to 30/70, more preferably 15/85 to 20/80. If the content of the fluorinated rubber (A) exceeds 50 mass %, an effect to reduce cost is small. If the content of the fluorinated rubber (A) is less than 5 mass %, standard state physical properties such as tensile strength, elongation and hardness of a rubber composition formed by crosslinking the acrylic rubber/fluorinated rubber composition deteriorate. Further, at the time of forming a laminate, the interlayer-adhesion to a layer formed by crosslinking a fluorinated rubber deteriorates.

In the fluorinated rubber composition and the acrylic rubber (B) to be kneaded in the step (2), the mixed ratio of the acrylic rubber (B), and the crosslinking agent for an acrylic rubber and the crosslinking coagent for an acrylic rubber in the fluorinated rubber composition is preferably from 0.5 to 15 parts by mass of the crosslinking agent for an acrylic rubber and from 0.1 to 7 parts by mass of the crosslinking coagent for an acrylic rubber, more preferably from 1 to 10 parts by mass of the crosslinking agent for an acrylic rubber and 0.5 to 5 parts by mass of the crosslinking coagent for an acrylic rubber, most preferably from 2 to 7 parts by mass of the crosslinking agent for an acrylic rubber and 1 to 3 parts by mass of the crosslinking coagent for an acrylic rubber, per 100 parts by mass of the acrylic rubber (B).

In the step (2), as a case requires, various additives such as a softening agent for rubber, a plasticizer, a filler, an antioxidant, a heat stabilizer, an ultraviolet absorber, a colorant, a processing aid, a lubricant, a grease, a fire retardant and an antistatic agent may be added and kneaded. Such additives may be preliminarily kneaded in the acrylic rubber (B), and the fluorinated rubber composition may be added therein and kneaded.

The content of such additives is from 0.1 to 100 parts by mass, preferably from 0.1 to 70 parts by mass, per 100 parts by mass of the acrylic rubber/fluorinated rubber composition.

In the step (2), the method for kneading a fluorinated rubber composition and an acrylic rubber (B) is not particularly restricted, and various extruders, a banbury mixer, a kneader or a roll may be used. An internal mixer such as a banbury mixer or a kneader is preferably used.

In the step (2), the heating temperature for kneading is preferably from 100 to 250° C., more preferably from 120 to 200° C., particularly preferably from 150 to 180° C. If the heating temperature is lower than 100° C., the reactivity is insufficient, and the crosslinking of the acrylic rubber (B) is insufficient in some cases. If the heating temperature exceeds 250° C., a rubber may deteriorate.

In the step (2), the kneading time is preferably from 3 to 60 minutes, more preferably from 5 to 30 minutes. If the kneading time is less than 3 minutes, the crosslinking of the acrylic rubber (B) tends to be insufficient. If the kneading time exceeds 60 minutes, the cost for kneading increases, such being undesirable. When the kneading time falls within the above range, the acrylic rubber (B) sufficiently crosslinks, whereby it is possible to obtain an acrylic rubber/fluorinated rubber composition having particles of the crosslinked acrylic rubber (B) dispersed in a continuous phase of the fluorinated rubber (A).

In the acrylic rubber/fluorinated rubber composition obtained by the process of the present invention, particles of the acrylic rubber (B) are dispersed in a continuous phase of the fluorinated rubber (A). The particles of the crosslinked acrylic rubber (B) has an average particle size of preferably from 2 to 30 µm, more preferably from 5 to 20 µm, most preferably from 10 to 15 µm. Further, in the present invention, the average particle size of the particles of the acrylic rubber (B) is an average value obtained by measuring a cross-sectional view of an acrylic rubber/fluorinated rubber composition by a scanning electron microscope and averaging the size of spontaneously selected 30 acrylic rubber particles.

Further, the gel component ratio in the acrylic rubber/fluorinated rubber composition is preferably at least 50%, more preferably at least 80%. Particularly, the gel component ratio is preferably from 80 to 100%.

Here, in the present invention, as the gel component ratio in the acrylic rubber/fluorinated rubber composition, a value ($W1/W2$) represented by percentage (($W1/W2$)×100) is used, where the mass of an insoluble component when immersing an acrylic rubber/fluorinated rubber composition in toluene for 24 hours is represented by $W1$, and the mass of the acrylic rubber/fluorinated rubber composition is represented by $W2$.

The crosslinkable composition of the present invention comprises the acrylic rubber/fluorinated rubber composition obtained by the above production process and a crosslinking agent for a fluorinated rubber.

The crosslinking agent for a fluorinated rubber is not particularly restricted, so long as it has reactivity to a fluorinated rubber, and conventional one may be used. Particularly, an organic peroxide compound is preferred, since a crosslinked rubber excellent in the heat resistance can be obtained. As the organic peroxide compound, any one may be used, so long as radicals can be easily generated under heating or in the presence of an oxidation/reduction system. However, an organic peroxide compound having a half-life period of 1 minute at a temperature of from 130 to 220° C. is preferred.

As specific examples of the organic peroxide, 1,1-di(t-hexylperoxy)-3,5,5-trimethylcyclohexane, 2,5-dimethylhexane-2,5-dihydroperoxide, di-t-butylperoxide, t-butylcumylperoxide, dicumylperoxide, α,α'-bis(t-butylperoxy)-p-diisopropylbenzene, 2,5-dimethyl-2,5-di(t-butylperoxy)-hexane, 2,5-dimethyl-2,5-di(t-butylperoxy)-hexine-3, dibenzoylperoxide, t-butylperoxybenzene, 2,5-dimethyl-2,5-di(benzoylperoxy)hexane, t-butylperoxy maleic acid, t-hexylperoxyisopropyl monocarbonate, etc. may be mentioned. Among them, α,α'-bis(t-butylperoxy)-p-diisopropylbenzene is preferred, since the peroxide crosslinking property of the fluorinated rubber (A) is excellent.

The content of the crosslinking agent for a fluorinated rubber is preferably from 0.1 to 10 parts by mass, more preferably from 0.2 to 7 parts by mass, particularly preferably from 0.5 to 5 parts by mass, per 100 parts by mass of the fluorinated rubber (A). When the content of the crosslinking agent for a fluorinated rubber falls within the above range, the crosslinking efficiency is high, and the amount of ineffectively decomposed products can be reduced.

Further, the crosslinkable composition of the present invention preferably contains a crosslinking coagent for a fluorinated rubber.

The crosslinking coagent for a fluorinated rubber may, for example, be triallyl cyanurate, triallyl isocyanurate, triacryl formal, triallyl trimellitate, dipropargyl terephthalate, diallyl phthalate, tetraallyl terephthalamide or triallyl phosphate. Among them, triallyl isocyanurate is preferred.

The content of the crosslinking coagent for a fluorinated rubber is preferably from 0.1 to 50 parts by mass, more preferably from 1 to 30 parts by mass, particularly preferably from 2 to 25 parts by mass, per 100 parts by mass of the fluorinated rubber (A). If the content of the crosslinking coagent for a fluorinated rubber is too small, the crosslinking rate is low, and the crosslinking degree is low. If the content is too large, the elongation of a crosslinked rubber tends to be low in some cases. When the content falls within the above range, the crosslinking rate is high, the crosslinking degree is high, and a crosslinked rubber having excellent properties can be obtained.

In the crosslinkable composition of the present invention, as a case requires, various additives may be further added by a conventional method. The additive may, for example, be a softening agent for a rubber, a plasticizer, a filler, an antioxidant, a heat stabilizer, an ultraviolet absorber, a colorant, a processing aid, a lubricant, a grease, a fire retardant or an antistatic agent.

The filler may, for example, be carbon black, white carbon, clay, talc, calcium carbonate, a fluorinated resin such as a polytetrafluoroethylene or an ethylene/tetrafluoroethylene copolymer, glass fiber or carbon fiber.

The carbon black has an effect to reinforce the crosslinked rubber. The carbon black is not particularly restricted, and one which is used as a filler for a fluorinated rubber may be used.

As specific examples of the carbon black, furnace black, acetylene black, thermal black, channel black, graphite, etc. may be mentioned. Among them, furnace black is more preferred. As specific examples of furnace black, HAF-LS carbon, HAF carbon, HAF-HS carbon, FEF carbon, GPF carbon, APF carbon, SRF-LM carbon, SRF-HM carbon, MT carbon, etc. may be mentioned. Particularly, MT carbon is preferred.

The content of carbon black is preferably from 5 to 100 parts by mass, more preferably from 10 to 80 parts by mass, per 100 parts by mass of the acrylic rubber/fluorinated rubber composition. If the content of carbon black is low, the effect to reinforce the crosslinked rubber cannot be sufficiently obtained in some cases. If the content is too large, the elongation of the crosslinked rubber tends to be low. When the content falls within the above range, the balance between the strength and elongation is excellent.

The content of a filler other than carbon black is preferably from 5 to 200 parts by mass, more preferably from 10 to 100 parts by mass, per 100 parts by mass of the acrylic rubber/fluorinated rubber composition.

As the processing aid, a higher fatty acid, an alkali metal salt of a higher fatty acid, etc. may be mentioned, and stearic acid, stearate or laurate is preferred. The content of the processing aid is preferably from 0.1 to 20 parts by mass, more preferably from 0.2 to 10 parts by mass, particularly preferably from 1 to 5 parts by mass, per 100 parts by mass of the acrylic rubber/fluorinated rubber composition.

The crosslinkable composition of the present invention is formed into various shapes by means of conventional various molding methods and used as a molded product. The molding method may, for example, be an injection molding method, an extrusion molding method or a compression molding method. A molded product to be obtained may be used as various parts for an automobile, industrial parts, etc. by utilizing its excellent properties. Among them, since a layer excellent in the adhesion to a layer formed by crosslinking a fluorinated rubber (C) can be formed, as a molded product of the crosslinkable composition of the present invention, a laminate having a layer formed by crosslinking a crosslinkable composition and a layer formed by crosslinking a fluorinated rubber is preferred. As a preferred example of the laminate, a heat resistant air rubber hose having a tubular outer layer formed by crosslinking a crosslinkable composition and a tubular inner layer formed by crosslinking a fluorinated rubber (C) on an inner periphery of the outer layer, may be mentioned. Even left under a high temperature condition, such a heat resistant air rubber hose is excellent in the interlayer-adhesion between both layers.

In the laminate and the heat resistant air rubber hose of the present invention, the fluorinated rubber (A) contained in the crosslinkable composition, and the fluorinated rubber (C) preferably contain the same material, and both the fluorinated rubber (A) and the fluorinated rubber (C) are preferably made of a tetrafluoroethylene/propylene copolymer. When the fluorinated rubber (A) and the fluorinated rubber (C) are made of a tetrafluoroethylene/propylene copolymer, a laminate and a heat resistant air rubber hose which are excellent in interlayer-adhesion, heat resistance, chemical resistance, oil resistance and pressure resistance can be formed.

The heat resistant air rubber hose may, for example, be produced by means of the following method.

First, respective materials for a crosslinkable fluorinated rubber composition for forming an inner layer, for example, a fluorinated rubber (C), a crosslinking agent for a fluorinated rubber and a crosslinking coagent for a fluorinated rubber, and as a case requires, a filler such as carbon black or another additive are prepared, and they are kneaded by using a kneading machine such as a two rolls, a banbury mixer or a kneader.

As the fluorinated rubber (C), the same one as the fluorinated rubber (A) may be used. Further, as the crosslinking agent for a fluorinated rubber, the crosslinking coagent for a fluorinated rubber and other additives, the same ones as used for producing the acrylic rubber/fluorinated rubber composition may be used.

The order of kneading respective components is not particularly restricted, however, it is preferred that a component which is likely to react or decompose such as a crosslinking agent for a fluorinated rubber is kneaded after sufficiently kneading together with a fluorinated rubber (C), a component which is not likely to react or decompose such as a filler. At the time of kneading, a kneading machine is cooled with water, and the temperature is preferably maintained at at most 120° C. which is a temperature at which the crosslinking agent for a fluorinated rubber is not likely to decompose. Further, a method may be employed wherein respective additives which are in a state dissolved and dispersed in a solvent are kneaded with a fluorinated rubber (C).

The crosslinkable fluorinated rubber composition prepared as described above and the crosslinkable composition of the present invention are coextruded into a hose shape by using an extruder, followed by heat crosslinking under the predetermined condition (for example, 160 to 190° C. and from 5 to 30 minutes), followed by second crosslinking in an oven under the predetermined condition (for example, 165° C. for 3 hours) to obtain the heat resistant air rubber hose of the present invention.

In the heat resistant air rubber hose obtained by this method, at the time of crosslinking, an inner layer and an outer layer are strongly bonded at the interface without using an adhesive, laminated and unified.

Further, the heat resistant air rubber hose of the present invention can also be produced by extruding by an extruder, a crosslinkable fluorinated rubber composition for forming an inner layer to form a hose having a monolayer structure, followed by extrusion molding the crosslinkable composition of the present invention on the outer surface of the hose by using an extruder and crosslinking the crosslinkable composition. Also by this method, the inner layer and the outer layer can be strongly bonded at the interface without an adhesive, laminated and unified. As the case requires, an adhesive may be used as a coagent. Further, as the case requires, a reinforcing yarn layer (polyester, vinylon, alamide, nylon or the like) may be formed between the inner layer and the outer layer.

The thickness of the inner layer of the heat resistant air rubber hose of the present invention is preferably from 0.2 to 3.0 mm, and with a view to reducing the cost, the thickness is more preferably from 0.2 to 0.5 mm.

Further, the heat resistant air rubber hose of the present invention may, for example, be formed into a straight shape by means of a vacuum sizing method or a concertina structure by using a corrugating machine.

The heat resistant air rubber hose of the present invention is excellent in heat resistance, chemical resistance, oil resistance and pressure resistance and particularly preferably used in applications required for having a high temperature/high pressure resistance such as an air hose for automobiles (turbo air hose, a hose for blowby gas, an emission control hose, etc.).

EXAMPLES

Now, the present invention will be described in detail with reference to Examples, but it should be understood that the present invention is by no means thereby limited.
(Materials Used)
[Fluorinated Rubber (A)]
(1) AFLAS 150L: manufactured by Asahi Glass Company, Limited, tetrafluoroethylene/propylene bipolymer, peroxide crosslinked type, fluorine content: 57 mass %, Mooney viscosity (100° C., ML1+10=35).
[Acrylic Rubber (B)]
(1) DENKA ER-5300: manufactured by Denki Kagaku Kogyo Kabushiki Kaisha, n-butyl acrylate having epoxy groups as crosslinking points/ethylene/vinyl acetate terpolymer, amine and peroxide crosslinked type.
[Fluorinated Rubber (C)]
(1) AFLAS 150P: manufactured by Asahi Glass Company, Limited, tetrafluoroethylene/propylene bipolymer, peroxide crosslinked type, fluorine content: 57 mass %, Mooney viscosity (100° C., ML1+10=95).
[Crosslinking Agent for an Acrylic Rubber]
(1) CN-25: manufactured by Denki Kagaku Kogyo Kabushiki Kaisha, 1-cyanoethyl-2-methylimidazole, (25% filler-containing type),
(2) CUREZOL 2MZ-H: manufactured by Shikoku Corporation, 2-methylimidazole.
[Crosslinking Coagent for an Acrylic Rubber]
(1) VULNOC AB-S: manufactured by Ouchi Shinko Chemical Industrial Co., Ltd., ammonium benzoate.
[Crosslinking Coagent for a Fluorinated Rubber]
(1) TAIC: manufactured by Nippon Kasei Chemical Co., Ltd., triallyl isocyanurate.
[Crosslinking Agent for a Fluorinated Rubber]
(1) PERBUTYL P: manufactured by NOF CORPORATION, α,α'-bis(t-butylperoxy)-p-diisopropylbenzene,
(2) PERCUMYL D: manufactured by NOF CORPORATION, bis(1-phenyl-1-methylethyl)peroxide,
(3) Perkadox 14R-P: manufactured by Kayaku Akzo Corporation, α,α'-bis(t-butylperoxy)-p-diisopropylbenzene.
[Filler]
(1) FEF carbon: manufactured by TOKAI CARBON CO., LTD., SEAST SO,
(2) MT carbon: manufactured by Canarb Limited, THENMAX N-990.
[Processing Aid]
(1) St-Na: manufactured by NOF CORPORATION, sodium stearate, NONSOUL SN-1 powder,
(2) St-Zn: manufactured by NOF CORPORATION, zinc stearate, zinc stearate GP.
[Antioxidant]
(1) NOCRAC CD: manufactured by Ouchi Shinko Chemical Industrial Co., Ltd., 4,4'-bis(α,α-dimethylbenzyl) diphenylamine.

Preparation of a Crosslinkable Composition

Example 1

Parts by mass of a fluorinated rubber (A) (AFLAS 150L), 12 parts by mass of a crosslinking agent for an acrylic rubber (CN-25) and 4 parts by mass of a crosslinking coagent for an acrylic rubber (VULNOC AB-S) were roll-kneaded to obtain a base compound (fluorinated rubber composition).

Figure 1:
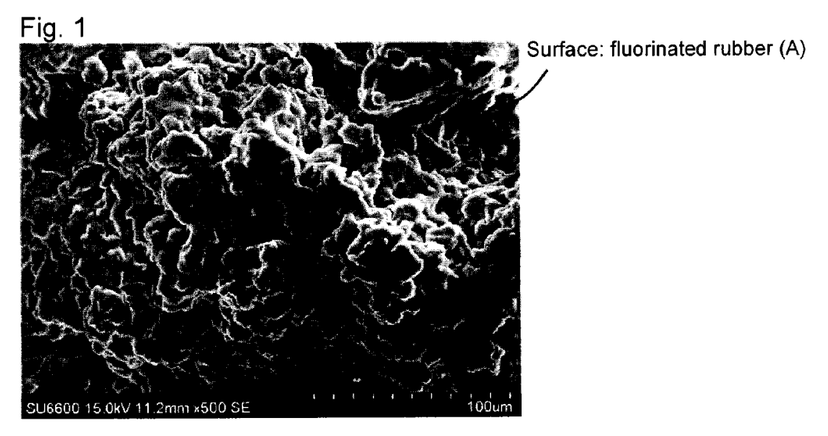
FIG. 1 is an image of a surface of the acrylic rubber/fluorinated rubber composition in Example 1 as observed by a scanning electron microscope (magnification: 500 times).

23.2 Parts by mass of the obtained base compound and 80 parts by mass of an acrylic rubber (B) (DENKA ER-5300) were kneaded for 20 minutes by using a Labo Plastomill R-30 manufactured by Toyo Seiki Seisaku-sho, Ltd. at a packing percentage of about 80%, at a rotational rate of the Labo Plastomill of 40 rpm and at an internal temperature of the Labo Plastomill of about 170° C. to dynamically crosslink the acrylic rubber (B), and thereby an acrylic rubber/fluorinated rubber composition was obtained. The surface of the obtained acrylic rubber/fluorinated rubber composition was observed by a scanning electron microscope (magnification: 500 times). As a result, particles of the crosslinked acrylic rubber (B) were found to be dispersed and covered with a continuous phase of the dispersed fluorinated rubber (A). This result was deduced as follows. That is, as a result of the elemental analysis carried out by observing the surface by the scanning electron microscope to identify whether the continuous phase present on the surface was a fluorinated rubber or not, a fluorine element was detected at a concentration of 9.3 mass %.

FIG. 1 shows a result of the observation by the scanning electron microscope.

Figure 2:
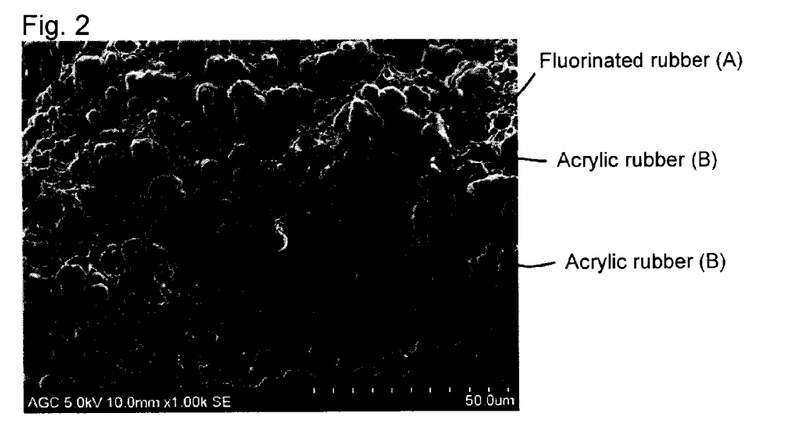
FIG. 2 is an image of a cross-section of the acrylic rubber/fluorinated rubber composition in Example 1 as observed by a scanning electron microscope (magnification: 1,000 times).

Further, a cross-section of the acrylic rubber/fluorinated rubber composition was observed by a scanning electron microscope (magnification: 1,000 times), and an average value of the sizes of optionally selected 30 acrylic rubber particles was taken as the average particle size. As a result, the average particle size of the acrylic rubber particles was 10 μm. FIG. 2 shows the result of the observation.

Further, the obtained acrylic rubber/fluorinated rubber composition was immersed in toluene for 24 hours, and a value (W1/W2) obtained by dividing the mass of an insoluble component which is not dissolved in toluene (W1) by the mass of the acrylic rubber/fluorinated rubber composition (W2) was converted to a percentage to calculate a gel component percentage of the acrylic rubber/fluorinated rubber composition. As a result, the gel component percentage was 96%.

Then, 100 parts by mass of the obtained acrylic rubber/fluorinated rubber composition, 0.5 part by mass of a crosslinking agent for a fluorinated rubber (PERCUMYL D), 50 parts by mass of a filler (FEF carbon), 5 parts by mass of a crosslinking coagent for a fluorinated rubber (TAIC) and 2 parts by mass of a processing aid (St-Zn) were kneaded by using a roll to obtain a crosslinkable composition of Example 1.

The obtained crosslinkable composition was press-crosslinked (pressure: 20 MPa) at 170° C. for 20 minutes, and then oven-hot air-crosslinked at 165° C. for 3 hours to prepare a crosslinked rubber sheet having a thickness of 2 mm. In accordance with JIS K6251 and JIS K6253, standard state physical properties of the crosslinked rubber sheet were evaluated. The tensile strength was 10.1 MPa, the elongation was 222%, and the hardness (shore-A) was 75.

Example 3

100 Parts by mass of a fluorinated rubber (A) (AFLAS 150L), 1 part by mass of a crosslinking agent for an acrylic rubber (CUREZOL 2MZ-H) and 2 parts by mass of a crosslinking coagent for an acrylic rubber (VULNOC AB-S) were roll-kneaded to obtain a base compound (fluorinated rubber composition).

20 Parts by mass of the obtained base compound and 80 parts by mass of an acrylic rubber (B) (DENKA ER-5300) were kneaded for 5 minutes by using a Labo Plastomill R-30 manufactured by Toyo Seiki Seisaku-sho, Ltd. at a packing percentage of about 80%, at a rotational rate of the Labo Plastomill of 40 rpm and at an internal temperature of the Labo Plastomill of about 170° C. Then, 2.5 parts by mass of a processing aid (St-Zn) was added, followed by kneading for 1 minute under the same condition to dynamically crosslink the acrylic rubber (B), and thereby an acrylic rubber/fluorinated rubber composition was obtained.

Then, 100 parts by mass of the obtained acrylic rubber/fluorinated rubber composition and 0.5 part by mass of a crosslinking agent for a fluorinated rubber (Perkadox 14R-P), 50 parts by mass of a filler (MT carbon), 5 parts by mass of a crosslinking coagent for a fluorinated rubber (TAIC), 2 parts by mass of a processing aid (St-Zn) and 1 part by mass of an antioxidant (NOCRAC CD) were kneaded by using a roll to obtain a crosslinkable composition of Example 3.

The obtained crosslinkable composition was press-crosslinked (pressure: 20 MPa) at 170° C. for 20 minutes, and then oven-hot air-crosslinked at 165° C. for 3 hours to prepare a crosslinked rubber sheet having a thickness of 2 mm. In accordance with JIS K6251 and JIS K6253, standard state physical properties of the crosslinked rubber sheet were evaluated. The tensile strength was 8.5 MPa, the elongation was 250%, and the hardness (shore-A) was 42.

Example 4

100 Parts by mass of a fluorinated rubber (A) (AFLAS 150L), 3 parts by mass of a crosslinking agent for an acrylic rubber (CUREZOL 2MZ-H) and 3 parts by mass of a crosslinking coagent for an acrylic rubber (VULNOC AB-S) were roll-kneaded to obtain a base compound (fluorinated rubber composition).

20 Parts by mass of the obtained base compound and 80 parts by mass of an acrylic rubber (B) (DENKA ER-5300) were kneaded for 5 minutes by using a Labo Plastomill KF 70V2 manufactured by Toyo Seiki Seisaku-sho, Ltd. at a packing percentage of about 80%, at a rotational rate of the Labo Plastomill of 40 rpm and at an internal temperature of the Labo Plastomill of about 170° C. Then, 2.5 parts by mass of a processing aid (St-Zn) was added, followed by kneading for 1 minute under the same condition to dynamically crosslink the acrylic rubber (B), and thereby an acrylic rubber/fluorinated rubber composition was obtained.

Then, 100 parts by mass of the obtained acrylic rubber/fluorinated rubber composition and 0.5 part by mass of a crosslinking agent for a fluorinated rubber (Perkadox 14R-P), 50 parts by mass of a filler (MT carbon), 5 parts by mass of a crosslinking coagent for a fluorinated rubber (TAIC), 2 parts by mass of a processing aid (St-Zn) and 1 part by mass of an antioxidant (NOCRAC CD) were kneaded by using a roll to obtain a crosslinkable composition of Example 4.

The obtained crosslinkable composition was press-crosslinked (pressure: 20 MPa) at 170° C. for 20 minutes, and then oven-hot air-crosslinked at 165° C. for 3 hours to prepare a crosslinked rubber sheet having a thickness of 2 mm. In accordance with JIS K6251 and JIS K6253, standard state physical properties of the crosslinked rubber sheet were evaluated. The tensile strength was 8.0 MPa, the elongation was 225%, and the hardness (shore-A) was 61.

Comparative Example 1

100 Parts by mass of a fluorinated rubber (A) (AFLAS 150L) was roll-kneaded to obtain a base compound (fluorinated rubber composition).

20 Parts by mass of the obtained base compound and 80 parts by mass of an acrylic rubber (B) (DENKA ER-5300) were kneaded for 20 minutes by using a Labo Plastomil at a packing percentage of about 80%, at a rotational rate of the Labo Plastomill of 40 rpm and at an internal temperature of the Labo Plastomill of about 170° C. to obtain an acrylic rubber/fluorinated rubber composition.

The outer appearance of the obtained acrylic rubber/fluorinated rubber composition was observed by a scanning electron microscope (magnification: 500 times). As a result, a phase of the fluorinated rubber (A) was dispersed in a phase of the acrylic rubber (B). Further, the average particle size of the acrylic rubber (B) was measured in the same manner as in Example 1, and the average particle size of the acrylic rubber (B) was 150 µm.

Then, 100 parts by mass of the obtained acrylic rubber/fluorinated rubber composition, 0.5 part by mass of a crosslinking agent for a fluorinated rubber (PERCUMYL D), 50 parts by mass of a filler (FEF carbon), 5 parts by mass of a crosslinking coagent for a fluorinated rubber (TAIC) and 2 parts by mass of a processing aid (St-Zn) were kneaded by using a roll to obtain a crosslinkable composition of Comparative Example 1.

Standard state physical properties of the obtained crosslinkable composition were evaluated in the same manner as in Example 1. The tensile strength was 4.1 MPa, the elongation was 501%, and the hardness (shore-A) was 84.

Comparative Example 2

A crosslinkable composition of Comparative Example 2 was obtained in the same manner as in Comparative Example 1, except that 100 parts by mass of an acrylic rubber/fluorinated rubber composition, 2.4 parts by mass of a crosslinking agent for an acrylic rubber (CN-25), 0.8 part by mass of a crosslinking coagent for an acrylic rubber (VULNOC AB-S), 0.5 part by mass of a crosslinking agent for a fluorinated rubber (PERCUMYL D), 50 parts by mass of a filler (FEF carbon), 5 parts by mass of a crosslinking coagent for a fluorinated rubber (TAIC) and 2 parts by mass of a processing aid (St-Zn) were kneaded by using a roll.

Standard state physical properties of the obtained crosslinkable composition were evaluated in the same manner as in Example 1. The tensile strength was 11.2 MPa, the elongation was 241%, and the hardness (shore-A) was 74.

Comparative Example 3

50 Parts by mass of a base compound and 50 parts by mass of an acrylic rubber (B) (DENKA ER-5300) were kneaded by using a Labo Plastomill in the same manner as in Comparative Example 1 to obtain an acrylic rubber/fluorinated rubber composition.

Figure 3:
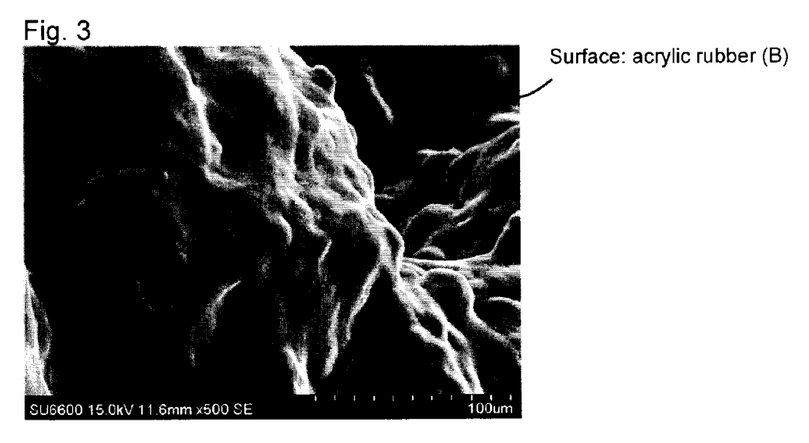
FIG. 3 is an image of a surface of the acrylic rubber/fluorinated rubber composition in Comparative Example 3 as observed by a scanning electron microscope (magnification: 500 times).

The surface of the obtained acrylic rubber/fluorinated rubber composition was observed by a scanning electron microscope (magnification: 500 times). As a result, a phase of the fluorinated rubber (A) was dispersed in a phase of the acrylic rubber (B). This result was deduced as follows. That is, in order to confirm that a continuous phase present on the surface is not the fluorinated rubber, the elemental analysis was carried out. As a result, the fluorine content was 0.0 mass %. Thus, the fluorine was not detected substantially. FIG. 3 shows a result of observation by the scanning electron microscope.

Further, the average particle size of the acrylic rubber (B) was measured in the same manner as in Example 1. As a result, the average particle size of the acrylic rubber (B) was 500 µm.

Then, 100 parts by mass of the obtained acrylic rubber/fluorinated rubber composition, 0.5 part by mass of a crosslinking agent for a fluorinated rubber (PERCUMYL D), 50 parts by mass of a filler (FEF carbon), 5 parts by mass of a crosslinking coagent for a fluorinated rubber (TAIC) and 2 parts by mass of a processing aid (St-Zn) were kneaded by using a roll to obtain a crosslinkable composition of Comparative Example 3.

Standard state physical properties of the obtained crosslinkable composition were evaluated in the same manner as in Example 1. The tensile strength was 4.7 MPa, the elongation was 438%, and the hardness (shore-A) was 75.

Comparative Example 4

20 Parts by mass of a base compound and 80 parts by mass of an acrylic rubber (B) (DENKA ER-5300) were kneaded by using a Labo Plastomill in the same manner as in Comparative Example 1 to obtain an acrylic rubber/fluorinated rubber composition.

The surface of the obtained acrylic rubber/fluorinated rubber composition was observed by a scanning electron microscope (magnification: 500 times). As a result, a phase of the fluorinated rubber (A) was dispersed in a phase of the acrylic rubber (B). This result was deduced as follows. That is, in order to confirm that a continuous phase present on the surface is not the fluorinated rubber, the elemental analysis was carried out. As a result, the fluorine content was 0.0 mass %. Thus, the fluorine was not detected substantially. FIG. 3 shows a result of observation by the scanning electron microscope.

Further, the average particle size of the acrylic rubber (B) was measured in the same manner as in Example 1. However, the average particle size of the acrylic rubber (B) could not be measured.

Then, 100 parts by mass of the obtained acrylic rubber/fluorinated rubber composition, 0.5 part by mass of a crosslinking agent for a fluorinated rubber (PERCUMYL D), 50 parts by mass of a filler (FEF carbon), 5 parts by mass of a crosslinking coagent for a fluorinated rubber (TAIC) and 2 parts by mass of a processing aid (St-Zn) were kneaded by using a roll to obtain a crosslinkable composition of Comparative Example 4.

Standard state physical properties of the obtained crosslinkable composition were evaluated in the same manner as in Example 1. The tensile strength was 6.8 MPa, the elongation was 506%, and the hardness (shore-A) was 66.

Table 1 shows the crosslinkable compositions of Examples 1, 3 and 4 and Comparative Examples 1 to 4 and the standard state physical properties.

TABLE 1

| | | Ex. 1 | Ex. 3 | Ex. 4 | Comp. Ex. 1 | Comp. Ex. 2 | Comp. Ex. 3 | Comp. Ex. 4 |
|---|---|---|---|---|---|---|---|---|
| The composition of the base compound (parts by mass) | Fluorinated rubber (A) (AFLAS 150L) | 100 | 100 | 100 | 100 | 100 | 100 | 100 |
| | Crosslinking agent for an acrylic rubber (CN-25) | 12 | — | — | — | — | — | — |
| | (CUREZOL 2MZ-H) | | 1 | 3 | | | | |
| | Crosslinking coagent for an acrylic rubber (VULNOC AB-S) | 4 | 2 | 3 | — | — | — | — |

TABLE 1-continued

|  |  | Ex. 1 | Ex. 3 | Ex. 4 | Comp. Ex. 1 | Comp. Ex. 2 | Comp. Ex. 3 | Comp. Ex. 4 |
|---|---|---|---|---|---|---|---|---|
| The composition of the acrylic rubber/fluorinated rubber composition (parts by mass) | Base compound Acrylic rubber (B) | 23.2 | 20 | 20 | 20 | 20 | 50 | 80 |
|  | (DENKA-5300) | 80 | 80 | 80 | 80 | 80 | 50 | 20 |
|  | St-Zn |  |  | 2.5 | 2.5 |  |  |  |
| The composition of the crosslinkable composition (parts by mass) | Acrylic rubber/fluorinated rubber composition | 100 | 100 | 100 | 100 | 100 | 100 | 100 |
|  | Crosslinking agent for a fluorinated rubber (PERCUMYL D) | 0.5 |  |  | 0.5 | 0.5 | 0.5 | 0.5 |
|  | (Perkadox 14RP) |  | 0.5 | 0.5 |  |  |  |  |
|  | Filler |  |  |  |  |  |  |  |
|  | (FEF carbon) | 50 |  |  | 50 | 50 | 50 | 50 |
|  | (MT carbon) |  | 50 | 50 |  |  |  |  |
|  | Crosslinking coagent for a fluorinated rubber (TAIC) | 5 | 5 | 5 | 5 | 5 | 5 | 5 |
|  | Processing aid (St-Zn) | 2 | 2 | 2 | 2 | 2 | 2 | 2 |
|  | Crosslinking agent for an acrylic rubber (CN-25) | — |  |  | — | 2.4 | — | — |
|  | (CUREZOL 2MZ-H) |  | — | — |  |  |  |  |
|  | Crosslinking coagent for an acrylic rubber (VULNOC AB-S) | — | — | — | — | 0.8 | — | — |
|  | Antioxidant (NOCRAC CD) |  | 1 | 1 |  |  |  |  |
| Standard state physical properties | Tensile strength (MPa) | 10.1 | 8.5 | 8 | 4.1 | 11.2 | 4.7 | 6.8 |
|  | Elongation (%) | 222 | 250 | 225 | 501 | 241 | 438 | 506 |
|  | Hardness (shore-A) | 75 | 42 | 61 | 84 | 74 | 75 | 66 |

(Laminate)

100 Parts by mass of a fluorinated rubber (C) (AFLAS 150P), 20 parts by mass of a filler (FEF carbon), 5 parts by mass of a crosslinking coagent for a fluorinated rubber (TAIC), 1 part by mass of a processing aid (St-Na) and 0.5 part by mass of a crosslinking agent for a fluorinated rubber (PERBUTYL P) were prepared, and they were kneaded by using a roll to prepare a crosslinkable fluorinated rubber composition.

An uncrosslinked rubber sheet of the above crosslinkable fluorinated rubber composition and an uncrosslinked rubber sheet of the crosslinkable composition prepared in any one of Examples 1, 3, 4 and Comparative Examples 1 to 4 were overlaid and press-crosslinked at 170° C. for 20 minutes, followed by secondary crosslinking in an oven at 165° C. for 3 hours to prepare laminates of Examples 2, 5, 6 and Comparative Examples 5 to 8. Here, the laminates were produced so as to have a thickness of a crosslinked fluorinated rubber composition layer of 1 mm and a thickness of a crosslinked acrylic rubber/fluorinated rubber composition layer of 1 mm.

By using the obtained laminates, in accordance with the following standard state physical properties were evaluated. Results are shown in Table 2.

[The Interlayer-Adhesion Under the Standard State]

Test samples were prepared by cutting each laminate sheet into a rectangular shape having a thickness of 2 mm (each 1 mm) and a width of 25.4 mm. The outer layer of each test sample was peeled at a rate of 50 mm/min by using a tensile tester (JIS B 7721) to measure the interlayer adhesive strength (N/mm). Further, the peeled state between the layers was visually observed. One in which material fracture resulted completely on the peeled surface was evaluated as ○ (excellent), one in which material fracture was partially resulted on the peeled surface was evaluated as Δ (good), and one which was peeled at the interface was evaluated as × (bad).

[The Interlayer-Adhesion Under High Temperature Condition]

Test samples were prepared by cutting each laminate sheet into a rectangular shape having a thickness of 2 mm (each 1 mm) and a width of 25.4 mm. The test sample was left for 10 minutes in a tensile tester (JIS B7721) provided with a thermostatic bath maintained at 150° C., and then the outer layer of the sample was peeled at a rate of 50 mm/min to measure the interlayer adhesive strength (N/mm). Further, the peeled state between the layers was visually observed. One in which material fracture was resulted completely on the peeled surface was evaluated as ○ (excellent), one in which material fracture was partially resulted on the peeled surface was evaluated as Δ (good), and one which was peeled at the interface was evaluated as X (not good).

TABLE 2

|  |  | Ex. 2 | Ex. 5 | Ex. 6 | Comp. Ex. 5 | Comp. Ex. 6 | Comp. Ex. 7 | Comp. Ex. 8 |
|---|---|---|---|---|---|---|---|---|
| Crosslinkable composition used |  | Ex. 1 | Ex. 3 | Ex. 4 | Comp. Ex. 1 | Comp. Ex. 2 | Comp. Ex. 3 | Comp. Ex. 4 |
| Interlayer adhesion under the standard state | The inter layer adhesive strength (N/mm) | 2.0 | 2.0 | 2.1 | 1.9 | 1.1 | 2.3 | 2.3 |
|  | Peeled state | ○ | ○ | ○ | x | x | x | x |

TABLE 2-continued

|  |  | Ex. 2 | Ex. 5 | Ex. 6 | Comp. Ex. 5 | Comp. Ex. 6 | Comp. Ex. 7 | Comp. Ex. 8 |
|---|---|---|---|---|---|---|---|---|
| Interlayer adhesion under high temperature condition | The inter layer adhesive strength (N/mm) | 0.22 | 0.22 | 0.24 | 0.11 | 0.10 | 0.24 | 0.26 |
|  | Peeled state | ○ | ○ | ○ | x | x | x | x |

It is evident from the results in Table 2 that the laminates prepared in Examples 2, 5 and 6 were excellent in the interlayer-adhesion under the standard state and under a high temperature condition.

On the other hand, it is evident from Table 2 that the laminate prepared in Comparative Example 5 had poor standard state physical properties of the acrylic rubber/fluorinated rubber composition layer. Further, regarding the interlayer-adhesion, as the peeling state, the layer was peeled at the interface.

Further, the laminate prepared in Comparative Examples 6 had an acrylic rubber/fluorinated rubber composition layer of which most parts were made of an acrylic rubber, and thereby the standard state physical properties were excellent. However, regarding the interlayer-adhesion of the laminate prepared in Comparative Example 6, the peeling state was interface peeling.

Further, although the laminate prepared in Comparative Examples 7 had improved standard state physical properties of the acrylic rubber/fluorinated rubber composition layer, as compared with Comparative Example 5, the physical properties were insufficient, and regarding the interlayer-adhesion, the peeling state was interface peeling, and the interlayer-adhesion was poor.

In the laminate prepared in Comparative Example 8, most parts of the acrylic rubber/fluorinated rubber composition layer were made of a fluorinated rubber, and thereby the standard state physical properties were excellent, however, the interlayer-adhesion was insufficient. Further, since the content of the fluorinated rubber was large, the cost was high.

INDUSTRIAL APPLICABILITY

The heat resistant air rubber hose made of the crosslinkable composition containing the acrylic rubber/fluorinated rubber composition of the present invention is excellent in heat resistance, chemical resistance, oil resistance and pressure resistance and thereby industrially useful. Particularly, the heat resistant air rubber hose is preferably used as an air hose for automobiles (such as a turbo air hose, a hose for blowby gas and an emission control hose).

This application is a continuation of PCT Application No. PCT/JP2013/050849, filed on Jan. 17, 2013, which is based upon and claims the benefit of priority from Japanese Patent Application No. 2012-007865 filed on Jan. 18, 2012. The contents of those applications are incorporated herein by reference in their entireties.

What is claimed is:

1. A process for producing an acrylic rubber/fluorinated rubber composition, the process comprising
    (1) kneading a fluorinated rubber (A), a crosslinking agent for an acrylic rubber, which does not react with the fluorinated rubber (A), and a crosslinking coagent for an acrylic rubber, which does not react with the fluorinated rubber (A), to obtain a fluorinated rubber composition containing the fluorinated rubber (A), the crosslinking agent, and the crosslinking coagent at a temperature of 30 to 100° C., and
    (2) kneading the fluorinated rubber composition while adding an acrylic rubber (B) in a mass ratio of the fluorinated rubber (A) to the acrylic rubber (B) of 5/95 to 50/50 to crosslink the acrylic rubber (B) at a temperature of 120 to 250° C., and dispersing particles of the crosslinked acrylic rubber (B) in a continuous phase of the fluorinated rubber (A).

2. The process according to claim 1, wherein the fluorinated rubber (A) is a copolymer comprising at least one repeating unit based on tetrafluoroethylene and at least one repeating unit based on propylene.

3. The process according to claim 2, wherein a molar ratio of the at least one repeating unit based on tetrafluoroethylene to the at least one repeating unit based on propylene in the fluorinated rubber (A) is from 40/60 to 70/30.

4. The process according to claim 2, wherein the fluorinated rubber (A) is a copolymer further comprises at least one repeating unit based on a monomer other than tetrafluoroethylene and propylene in a content of at most 10 mol %.

5. The process according to claim 1, wherein a fluorine content in the fluorinated rubber (A) is from 40 to 75 mass %.

6. The process according to claim 1, wherein the acrylic rubber (B) comprises from 30 to 100 mass % of at least one repeating unit based on a (meth)acrylic monomer, from 0 to 30 mass % of at least one repeating unit based on ethylene, from 0 to 40 mass % of at least one repeating unit based on vinyl acetate, and from 0.1 to 20 mass % of at least one repeating unit based on a crosslinkable group-containing monomer.

7. The process according to claim 6, wherein the crosslinkable group-containing monomer comprises an epoxy group as a crosslinkable group.

8. The process according to claim 7, wherein
    the crosslinking agent for an acrylic rubber is at least one selected from the group of an amine, an acid, and a compound comprising an isocyanate group, and
    the crosslinking coagent for an acrylic rubber is a polyamine and/or an ammonium salt of an organic acid.

9. The process according to claim 1, wherein in the kneading (1), from 0.5 to 20 parts by mass of the crosslinking agent and from 0.05 to 10 parts by mass of the crosslinking coagent per 100 parts by mass of the fluorinated rubber (A) are kneaded to obtain the fluorinated rubber composition.

10. The process according to claim 1, wherein in the kneading (2), the crosslinked acrylic rubber (B) particles having an average particle size of from 2 to 30 μm are dispersed in the continuous phase of the fluorinated rubber (A).

11. The process according to claim 1, wherein
    the kneading (1) is performed for a time of 5 to 60 minutes, and the kneading (2) is performed for a time of 3 to 60 minutes.

12. The process according to claim 1, wherein during the kneading (2), a part of the fluorinated rubber (A) is physically entangled with the acrylic rubber (B) so as to pseudo crosslink.

13. The process according to claim 1, wherein in the kneading (2), at least one additive selected from the group consisting of a softening agent for rubber, a plasticizer, a filler, an antioxidant, a heat stabilizer, an ultraviolet absorber, a colorant, a processing aid, a lubricant, a grease, a fire retardant, and an antistatic agent is added and kneaded.

* * * * *